United States Patent [19]

Choi et al.

[11] Patent Number: 5,082,436
[45] Date of Patent: Jan. 21, 1992

[54] APPARATUS FOR DEFORMING THERMOPLASTIC MATERIAL USING RF HEATING

[75] Inventors: Tak-Ming Choi, Troy; Adalbert Konrad, Glenville; Bang M. Kim, Schenectady County; James J. Carroll, Sr., Ballstone Lake, all of N.Y.

[73] Assignee: General Electric Company, Schenectady, N.Y.

[21] Appl. No.: 629,003

[22] Filed: Dec. 18, 1990

Related U.S. Application Data

[63] Continuation of Ser. No. 379,760, Jul. 14, 1989, abandoned.

[51] Int. Cl.$^5$ .............................. B29C 35/12
[52] U.S. Cl. ................. 425/174.8 R; 264/26; 264/327; 264/DIG. 46; 425/DIG. 13
[58] Field of Search .............. 264/25, 26, DIG. 46, 264/327; 425/174.6, 174.8 R, 174.8 E, DIG. 13, 174

[56] References Cited

U.S. PATENT DOCUMENTS

| | | | |
|---|---|---|---|
| 2,423,902 | 7/1947 | Peterson | 425/174.8 R |
| 3,289,253 | 12/1966 | Buonaiuto | 264/26 |
| 3,444,275 | 5/1969 | Willett | 264/327 |
| 3,937,774 | 2/1976 | Wiley et al. | 264/26 |
| 4,134,942 | 1/1979 | Mirr et al. | 264/26 |
| 4,179,252 | 12/1979 | Seufert | 425/174.6 |
| 4,196,158 | 4/1980 | Ward | 264/25 |
| 4,423,191 | 12/1983 | Haven et al. | 264/26 |
| 4,824,617 | 4/1989 | Takeuchi et al. | 264/26 |
| 4,851,167 | 7/1989 | Marc | 264/26 |
| 4,921,646 | 5/1990 | Stewart | 264/26 |
| 4,921,647 | 5/1990 | Stewart | 264/26 |
| 4,937,021 | 6/1990 | Danforth et al. | 264/26 |
| 4,943,224 | 7/1990 | Nied et al. | 425/174.8 R |

FOREIGN PATENT DOCUMENTS

| | | | |
|---|---|---|---|
| 2361634 | 6/1975 | Fed. Rep. of Germany | 425/174.8 R |
| 60-4026 | 1/1985 | Japan | 264/327 |
| 585870 | 2/1947 | United Kingdom | 264/26 |

*Primary Examiner*—Jeffery Thurlow
*Attorney, Agent, or Firm*—Patrick R. Scanlon; James C. Davis, Jr.; Paul R. Webb, II

[57] ABSTRACT

A dielectric mold member has different thicknesses producing different radio frequency (RF) voltage drops thereacross. An RF electrode is spaced differently from a thermoplastic sheet to be dielectrically heated by the RF energy such that in one implementation the sheet receives uniform potentials and is heated uniformly. In other implementations, the sheet can receive selectively controlled heating over different regions. In an alternative embodiment, multiple pairs of electrodes apply different RF field levels to different portions of the thermoplastic sheet to compensate for the different voltage drops due to different mold thicknesses or to applied different controlled heating levels to different regions.

7 Claims, 4 Drawing Sheets

APPARATUS FOR DEFORMING THERMOPLASTIC MATERIAL USING RF HEATING

This application is a continuation of application Ser. No. 07/379,760, filed July 14, 1989 now abandoned.

This invention relates to apparatus and method for deforming thermoplastic materials and, more particularly, to such apparatus that uses radio frequency (RF) heating.

Of interest are co-pending application Ser. No. 07/486,491, which is a continuation of application Ser. No. 253,513 filed Oct. 5, 1988 entitled, "Method and Apparatus for Molding Plastics on Hot Surfaces Using Dielectric Heating" in the name of Kim, now abandoned, Ser. No. 07/357,829 filed May 30, 1989 entitled "Apparatus and Method for Forming Plastic Using Local RF Heating" in the name of Kim et al. and Ser. No. 135,762 filed Dec. 21, 1987 entitled, "Reinforced Composite and Method of Manufacture", in the name of Kim et al., now U.S. Pat. No. 4,859,524 all of the above being assigned to the assignee of the present invention.

In a typical flow forming process, a thermoplastic composite substrate comprising a glass fiber reinforced thermoplastic resin material is heated in a conventional oven by convection or infrared radiation to soften the material for subsequently deforming the material, typically in sheet form. After the material is heated, it is transported to a mold and the material is deformed by the mold having the desired shape for the finished part, the mold drawing the material into that shape. This technique, generally, is called thermo-forming. The deformation process can be done by evacuating the space between the material and the mold, referred to as vacuum forming, pressing the material against the mold using moderately pressurized air, known as pressure forming, or compressing the material between two mating dies, referred to as compression molding alternatively referred to as flow molding. The process of placing the sheet in an oven, heating the sheet and then transporting the heated sheet to a mold for subsequent deformation is cumbersome due to the various handling procedures for the thermoplastic material.

Further, during the transfer of the heated sheet from the oven to the mold, the sheet surface may cool somewhat causing the surface resin to "freeze" into position. This "freezing" of the surface resin typically prevents the surface resin from flowing readily during the molding process and, consequently, may produce rough boundaries between newly formed surface areas produced by the compression molding and the original surface areas of the planar sheet material. Also, the cooled surface material may tear or fracture when compressed.

An additional problem inherent in existing molding processes employing ovens for heating the sheet material is that conventional oven heating relies upon heat conduction from the external surface layers to the inner bulk layer within the sheet material. Thus, a temperature gradient appears across the sheet material from the surface layer to the interior. Prolonged heating to insure that the inner portions are melted can result in over softening of the surface resin, which in turn facilitates other problems such as lofting of internally located fibers to the surface layer introducing increased surface roughness. Further, prolonged heating can also cause thermal decomposition of the thermoplastic resin. Heating material by use of a conventional oven also requires excess time to heat the sheet.

Certain processes for manufacturing thermoplastic resin products, including reinforced thermoplastic resin composites, utilize the heating technique known as radio frequency (RF) heating. RF heating utilizes the dielectric properties of the material to generate heat therein. When electromagnetic radiation at a selected radio frequency is applied to the material, the alternating electric field of the RF electromagnetic radiation causes an oscillatory displacement of polarized molecules of the material, thereby resulting in a rise in the temperature of the material. The amount of heat generated therein is given by the well known formula:

$$P = E^2 \epsilon_0 \epsilon_r \tan \delta \omega$$

where P is the amount of heat produced, E is the root mean square electric field strength at a given angular frequency $\omega$, $\epsilon_0$ is the permittivity of free space, $\epsilon_r$ is the relative permittivity of the material and $\tan \delta$ is the loss tangent. The ability of the material to generate heat when exposed to RF radiation is referred to as its RF sensitivity.

RF heating may be used on thermoplastic resins that have been traditionally difficult to process, such as ultra-high molecular weight polyethylene. Such materials may be molded and extruded with conventional equipment by the addition of RF sensitive material, i.e., material having a sensitivity greater than the material to which it is added. For example, reference is made to co-pending application Ser. No. 135,762 mentioned above, now U.S. Pat. No. 4,859,524.

The use of RF heating is preferable to conventional ovens in that the plastic material may be heated within the mold and therefore the cumbersome transfer of the heated plastic from the oven to the mold is avoided. However, it is still important that the thermoplastic sheet material be heated uniformly to obtain uniform flow of the material during the compression forming process. If portions of the material remain cool and unmolten, then those portions may result in defective forming. For example, U.S. Pat. No. 4,268,238 discusses the problem of providing uniform heating of two-dimensional plastic pieces wherein the pieces may have non-uniform thicknesses. As disclosed therein, to obtain a uniform heating of the plastic material, an additional material is added between the two RF electrodes to provide a uniform dielectric constant in the field in which the plastic material is located. However, the plastic material is illustrated as having a preformed non-uniform thickness wherein the dielectric material added to provide uniform electric field has a complementary deformed shape.

A second solution is suggested in U.S. Pat. No. 4,268,238 in which two shaped mating electrodes are used as mold members to provide uniform heating of the material to be deformed. However, this patent appears to ignore the problem that if the plastic material were planar as occurs in typical thermo-forming processes, such shaped electrodes tend to cause non-uniform heating of such a planar sheet.

A problem is also present in the deformation of uniformly thick thermoplastic sheet material in a molding operation employing dielectric molds. In certain instances it is desired to deform thermoplastic sheet material with an in-mold situated RF electrode arrangement and a dielectric mold. This normally would require the use of a non-uniformly thick mold in combination with uniformly spaced electrodes. The use of uniformly spaced electrodes for generating an RF field through a non-uniform thick dielectric mold to heat the thermoplastic sheet material would result in non-uniform heating of the thermoplastic material. The present inventors recognise, therefore, a need for an apparatus for in-mold uniform heating and then deforming of a thermoplastic material in which a dielectric mold member is used to deform the material and exhibits non-uniform voltage drops between at least one of the RF electrodes and the material to be deformed.

An apparatus for deforming thermoplastic material located in a mold deformation region according to the present invention comprises means for generating a radio frequency signal and mold means including dielectric deforming means for deforming the material and having opposing sides, at least a portion of the dielectric means exhibiting a non-uniform thickness in a given direction causing a non-uniform voltage gradient in the direction between first and second planes at the opposing sides. The first plane is at the deformation region. Means including at least one electrode at the second plane substantially uniformly dielectrically heat the material with the signal passing through the dielectric deforming means in the given direction to the first plane until the material is substantially uniformly sufficiently soft to deform. In one embodiment of the present invention, for example, one of the electrodes may have a non-planar surface for equalizing the field in the region of the material to be heated.

A method for deforming thermoplastic material according to the present invention includes generating a radio frequency signal and creating at least one radio frequency field by passing the signal different distances in a given direction through a mold and ambient atmosphere of different dielectric values such that the at least one field is substantially uniform in a given mold region. The thermoplastic member in the region is heated with the uniform field until the material is soft and then the soft material deformed.

Figure 1:
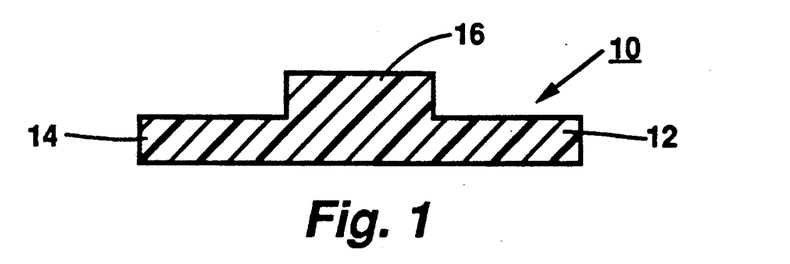
FIG. 1 is a section elevation view through a thermoplastic article useful for illustrating the problem and solution to the problem offered by the apparatus and method according to one embodiment of the present invention.

In FIG. 1, assume that an article 10 is to be formed by a molding process employing RF electrodes used both for in-mold heating and molding. The article 10 comprises a planar uniformly thick pair of flanges 12 and 14 and a raised ridge 16. The flanges 12 and 14 and ridge 16 are assumed for purpose of illustration to be rectangular and linear. It is desired to form the ridge 16 from an originally uniformly thick sheet of thermoplastic material by compression molding.

Figure 2:
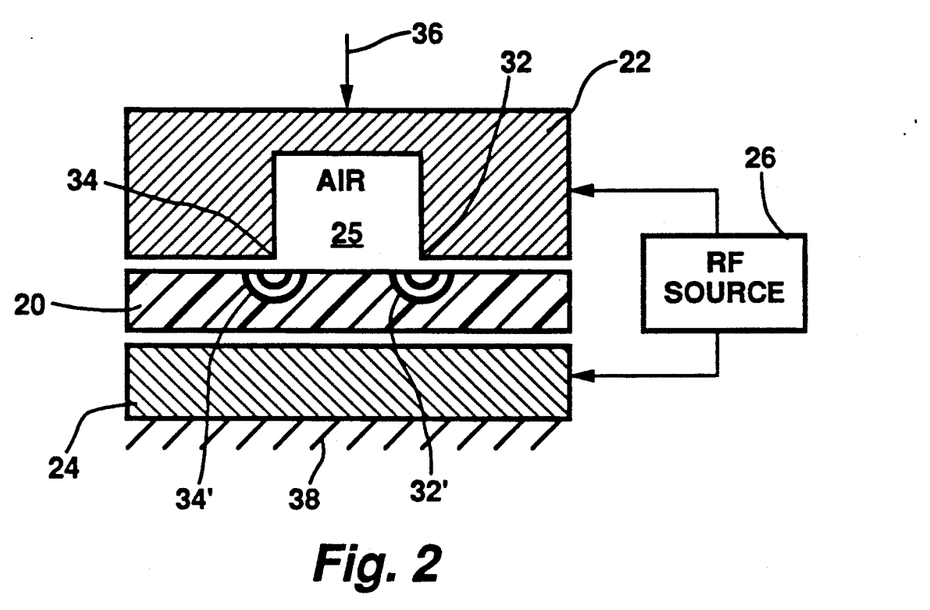
FIG. 2 is a diagrammatic section elevation view through a molding system employing RF heating and deforming electrodes.

In FIG. 2, a uniformly thick sheet 20 of thermoplastic material is shown. A first metal electrode 22 is adjacent to one surface of the sheet 20 and a second electrode 24 is adjacent to an opposing surface of the sheet 20. To form the ridge 16, the electrode 22 includes a rectangular channel 25. An RF signal source 26 applies an RF signal to the electrodes which create a field between the electrodes 22 and 24 in the region of the sheet 20. However, it can be shown that the corners 32 and 34 of electrode 22 create localized hot spots represented by respective dark semi-circular rings 32' and 34'. These localized hot spots tend to undesirably and excessively melt the thermoplastic material in local regions. The heated material is later compression deformed by displacing electrode 22 in direction 36 while maintaining electrode 24 fixed in place by a support, represented by symbols 38. The localized hot spots 32' and 34' of excessively molten thermoplastic material results in the material not flowing in accordance with the shape of the electrode 22 at corners 32 and 34 and may cause a misshapen article. For this reason, typical thermo-forming electrodes are spaced a uniform distance from the material to be heated as illustrated by the spaced relationship of electrode 24 to sheet 20 and, for example, as disclosed in aforementioned U.S. Pat. No. 4,268,238.

Figure 3:
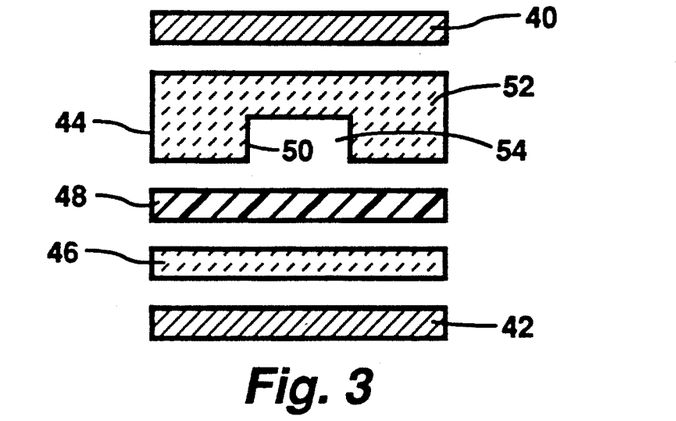
FIG. 3 is a diagrammatic section elevation view of one molding system employing in-mold RF electrodes.

In an alternate arrangement, FIG. 3, a pair of RF electrodes, such as electrodes 40 and 42 each comprising a planar metal electrode structure are energized to create an RF field from a source (not shown). Between the electrodes 40 and 42 are two dielectric mold members 44 and 46. Between the mold members is a uniformly thick thermoplastic sheet 48. The dielectric mold member 44 includes a channel 50 for forming the ridge 16 in the article 10 of FIG. 1. It can be shown that when electrodes 40 and 42 are energized, the RF field in the region of sheet 48 is non-uniform due to the presence of the different dielectric values of the mold member 44 and the free space of ambient atmosphere present between the electrode 40 and sheet 48 in channel 50. That is, the voltage drop in region 52 is different than the voltage drop in the air region 54 of channel 50. These different voltage drops tend to create different potentials at the sheet and cause uneven heating of the sheet 48.

Figure 4:
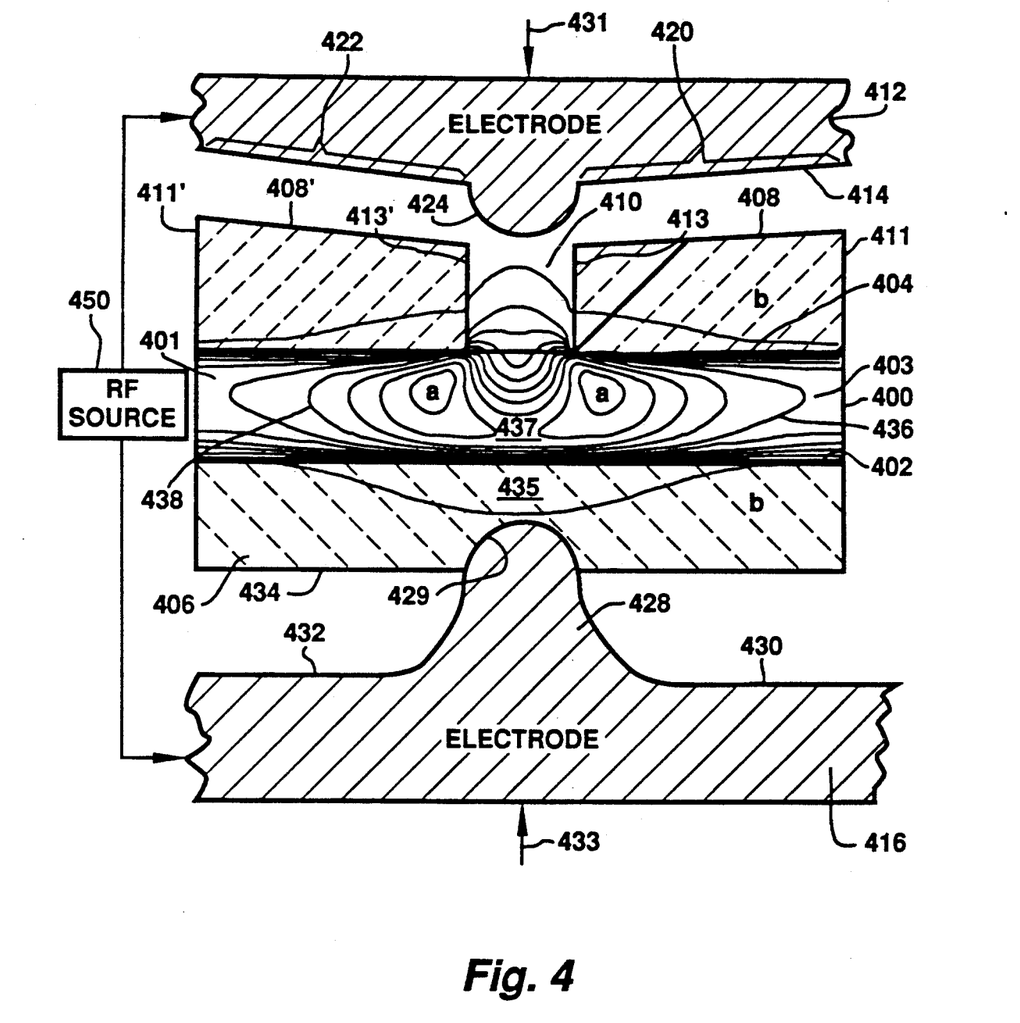
FIG. 4 is a section elevation view somewhat diagrammatic in representation of a molding system in accordance with one embodiment of the present invention for illustrating certain principles of the invention.

In FIG. 4, a system is illustrated for compression forming a thermoplastic sheet 400. Sheet 400 may be pure thermoplastic resin, sometimes referred to as a neat resin, or a composite material comprising a thermoplastic resin reinforced with glass fibers or with radio frequency sensitive material. Sheet 400, for purpose of illustration only, generally has a uniform thickness between opposing broad surfaces 402 and 404. Surface 402 is deformed by a dielectric mold member 406 and surface 404 is deformed by spaced mirror image dielectric mold members 408 and 408'. Members 408 and 408' are spaced forming therebetween an air gap 410. The mold members 406, 408 and 408' are electrically non-conductive and may comprise ceramics, plastics, and plastic compositions capable of withstanding the temperatures and pressures required to deform sheet 400. Glass, carbon, or ceramic fibers or mixtures thereof, may be used in the thermoplastic sheet, but glass fibers are preferred for certain applications due to their relatively low cost. Any thermoplastic resin may be used in the sheet 400.

Thermoplastic resins inherently possess some degree of sensitivity to RF radiation, though the degree of sensitivity varies between the many species of resins. Thus, the sensitivity of a composite to an RF radiation can be enhanced by the addition of RF material having a greater RF sensitivity than the composite. For purpose of simplicity of illustration however, it is assumed that the thermoplastic sheet 400 inherently possesses RF radiation sensitivity and an RF sensitive material is not added thereto. RF sensitive polymer plastics include acrylics, polyamid thermoplastics sold under the trademark NYLON by E. I. Dupont Company, Inc., polybutylene terephthalate, sold under the trademark VALOX by General Electric Company, a blend of polycarbonate and polybutylene terephthalate known as XENOY, PVC (polyvinyl chloride), vinyl acetate and acrylonitriles.

Organic activators may be added to thermoplastics having low RF sensitivity. For example, such plastics include TEFLON, a polytetrafluoroethylene sold by and a trademark of E. I . Dupont Co, Inc., a polycarbonate thermoplastic known as LEXAN, a mixture of high impact polystyrene and polyphenylene oxide known as NORYL, all registered trademarks of and available from General Electric Company, or a polyolelfin such as polyethylene or polypropylene. Organic examples of certain activators include triethanol amine, glycols, and glycerin.

Some inorganic materials which increase RF sensitivity are carbon particles, metals such as aluminum, metal oxides such as iron oxide and zinc oxide, aluminum silicates such as bentonite and clays, and fly ash. There are also commercially available sensitizers such as sold under the trademarks, FREQUON B-30 and FREQUON B-31 by the Struktol Co. For purpose of simplicity of illustration, it is assumed that the thermoplastic sheet 400 is naturally RF sensitive.

If an active RF activator is employed, it is assumed for purpose of illustration that the activator is uniformly distributed throughout the sheet 400 to make it uniformly sensitive to an RF field for creating heat by the dielectric heating phenomena. In other embodiments, the activator may be non-uniformly distributed as shown by way of example in co-pending application Ser. No. 07/357,829, filed 5/30/89 mentioned above, now abandoned.

The mold members 408 and 408' are tapered somewhat having a thicker region at respective edge surfaces 411 and 411' adjacent to the edges of the sheet 400 and a thinner region at edge surfaces adjacent to the gap 410. As known, the mold members comprises materials typically having a different dielectric constant than that of the air in gap 410 between the members 408 and 408'. As a result, a uniform RF signal if applied via planar electrodes, as illustrated by the electrodes of FIG. 3, through the mold members 408, 408' and 406 create different non-uniform voltage gradients thereacross. These gradients cause non-uniform heating of the thermoplastic sheet 400 due to the different potentials at the thermoplastic sheet. A metal electrode 412, spaced above the mold members 408 an 408', has a contoured shaped surface 414 which is spaced different distances from the nearest surface 404 of the thermoplastic sheet 400 so as to illustrate the involved phenomena.

Electrode 412 surface 414 is inclined somewhat at regions 420 and 422 parallel to the mating facing surfaces of respective members 408 and 408' and inclined relative to plastic sheet 400. An electrode ridge 424 is spaced above the air gap 410 so as to reduce the distance from the electrode 412 to the surface 404 of the sheet 400. The ridge 424 is curved somewhat to avoid generating localized hot spots.

A metal electrode 416 facing mold member 406 is contoured shaped. Electrode 416 includes a central curved ridge 428 somewhat complementary to the ridge 424 of electrode 412. Mold member 406 has a groove 429 which mates with the tip of ridge 428. The portions of the electrode 416 in regions 430 and 432 adjacent ridge 428 are parallel to surface 434 of the mold member 406 and to sheet 400. The ridges 424 and 428 reduce the spacing to the sheet 400, thus increasing the potentials gradient thereat as compared to the absence of such ridges. The electrode 412 is displaced in direction 431 and electrode 416 is in direction 433 by means (not shown). The electrodes then squeeze and deform sheet 400 for the shape of article 10, FIG. 1. The deformation occurs after sheet 400 is heated.

Lines 436, 438 and so on represent regions of constant temperature induced in the thermoplastic sheet 400 by the electrodes 412 and 416 in conjunction with mold members 408, 408' and 406. The regions labeled a in sheet 400 have been measured to be the hottest at about 27° C. and the regions labeled b in the mold members have been measured to be the coldest at about 25° C. The variation between the constant temperature lines is in fractions of a °C. The temperature difference between adjacent lines of constant temperature are measured in approximately several hundredths of a °C. The regions above surface 404 in the air gap 410 are the coolest whereas the regions adjacent to the central portion of the sheet 400 near region a are the hottest. While there is non-uniformity of temperature distribution in the sheet 400 exhibited by the electrodes and mold members illustrated in FIG. 4, the temperature distribution demonstrates that uniform heating of thermoplastic sheet 400 can be obtained by shaping the electrodes accordingly. As shown, the region in sheet 400 just beneath the channel 410 is cooler than the regions beneath member 408 edge 411. The regions 401 and 403 adjacent to sheet edges are cooler than a portion of the sheet 400 central region adjacent gap 410. Note regions labeled a and the region 437 of the sheet 400 are heated by electrode ridge 428. This example demonstrates that shaping the electrode surface can compensate for differences in voltage drops between one electrode and an article to be heated.

An important aspect of the present invention is that the electrodes can heat the thermoplastic sheet 400 substantially uniformly while the sheet 400 is in the mold and situated between the mold members 408 and 408' and 406 of different thickness used to deform the sheet into the shape of the desired article, e.g. article 10, FIG. 1. It should be understood that the energy from RF signal source 450 is initially applied to electrodes 412 and 416 for heating the thermoplastic sheet 400 to its temperature above its transition temperature $T_g$. Once the thermoplastic sheet 400 is heated above its transition temperature in the desired regions of the sheet, the energy to the electrodes is removed, or in the alternative, the electrodes 412 and 416 can be removed from the mold, if desired. The mold members 408 and 408' and 406 then are compressed toward one another in directions 431 and 433, respectively, either by the electrodes 412 and 416, or other means, so as to deform the softened heated thermoplastic sheet into the shape of the article. The uniformly heated thermoplastic sheet material flow forms into the desired shape substantially without undesired deformation due to localized hot and cold spots illustrated in FIG. 2.

Figure 5:
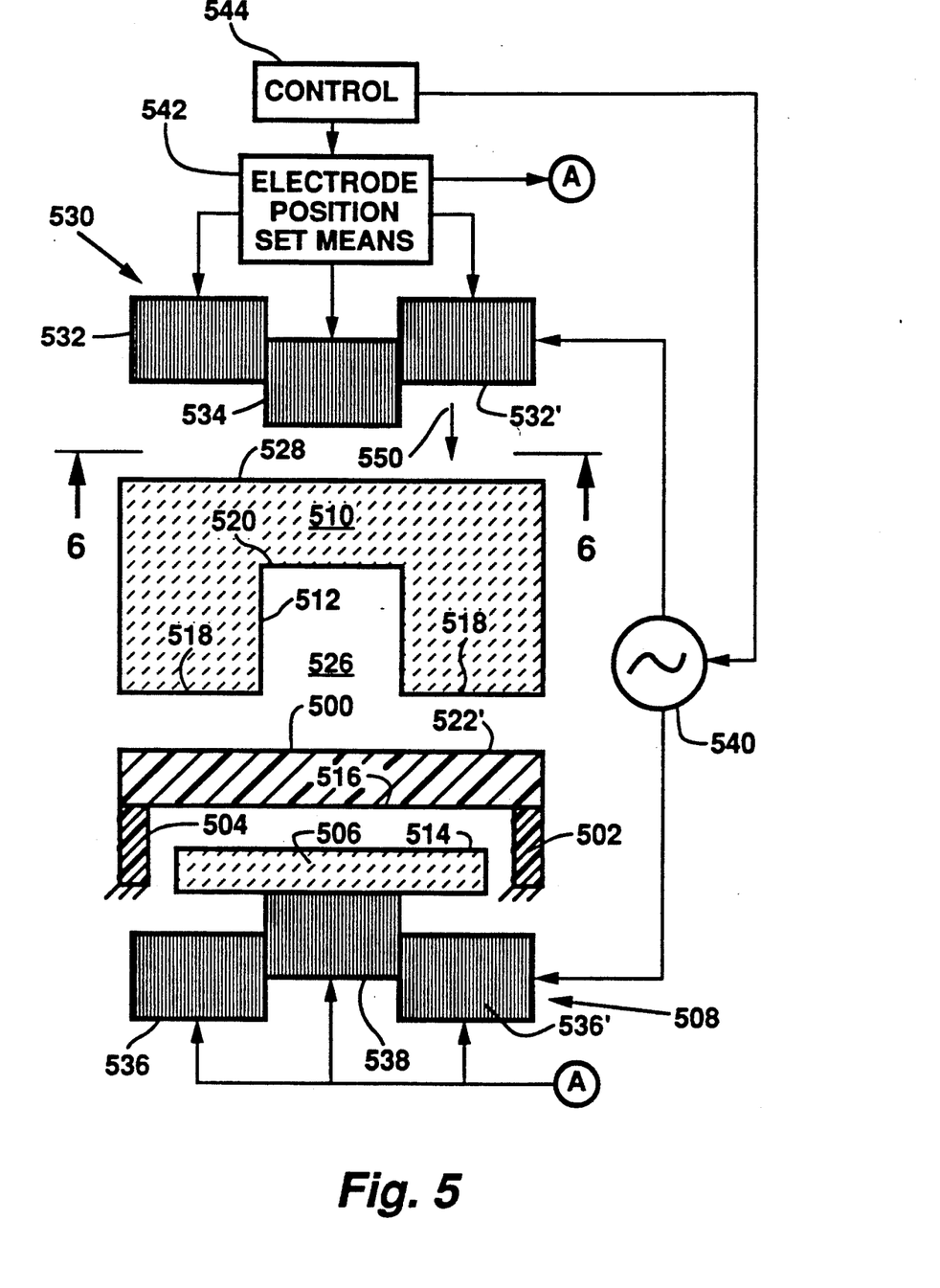
FIG. 5 is a diagrammatic elevation section view of a system in accordance with a second embodiment of the present invention.

In FIG. 5, a uniformly thick homogeneous thermoplastic sheet 500, similar to sheet 400 of FIG. 4, is supported in a mold by insulating supports 502 and 504. The sheet 500 typically may have a thickness between $\frac{1}{8}$-$\frac{1}{4}$ inch. If desired, supports 502 and 504 can be replaced by a conveyor belt (not shown) or sheet 500 may be supported directly on a dielectric mold member, such as member 506.

Dielectric mold members 506 and 510 may be made of ceramic, plastics, or plastic composite materials capable of withstanding the temperatures and pressures required to deform sheet 500. For purpose of illustration, it is assumed that the sheet 500 is to be deformed to the shape of article 10, FIG. 1. The mold member 506 is a planar, uniformly thick structure which is supported by electrode 508 or by other means. Disposed on the opposite side of sheet 500 is a dielectric mold member 510 comprising a rectangular block of dielectric material having an elongated rectangular channel 512. Mold member 506 is a plane rectangular structure which has a surface 514 which is planar and parallel to surface 516 of sheet 500. Mold member 510 has surfaces 518 and 520 which are planar and parallel to surface 522' of sheet 500. Surfaces 518 are co-planar and spaced equal distances from surface 522. Mold member 506 surface 514 is equally spaced from surface 516 of sheet 500.

Because of the presence of the air gap 526 created by channel 512, the free space dielectric constant from surface 520 of mold member 510 to surface 522' of the thermoplastic sheet is different than the dielectric constant of member 510 over similar distances to surface 522. Therefore, different potentials exist at surface 522' at these different regions unless otherwise provided for assuming the electrode surface inducing the RF field is uniformly spaced from the surface 522'.

Electrode 530 according to one embodiment of the present invention comprises three segments 532, 532', and 534. Segments 532 and 532' are identical and equally spaced from surface 522' of the thermoplastic sheet. Central electrode segment 534 is spaced closer to the thermoplastic sheet 500 so as to present a substantially uniform potential at surface 522' of sheet 500 to compensate for the greater voltage drop in gap 526. By spacing the electrode segment 534 closer to the thermoplastic sheet 500, the different voltage gradients across air gap 526 as compared to the gradient across the thicker portions of the member 510 adjacent surface 518 is compensated for. Electrode 508, which may be identical to electrode 530, comprises three electrode segments 536, 536', and 538. For purposes of illustration, electrode segments 536 and 536' are identical to electrode segments 532 and 532' and similarly positioned and oriented. The electrode segment 538 is spaced closer to the thermoplastic sheet 500 than electrode segments 536 and 536' to induce a substantially uniform potential at the surface 516 of the thermoplastic sheet.

An RF signal source 540 is coupled to electrodes 530 and 508 for providing RF energy thereto. Electrode position means 542 under operation of a control 544 selectively displaces the electrode segments of electrode 530 in a direction against mold member 510 simultaneously with the displacement of electrode 508 toward mold member 506. The electrode displacements force the mold members 506 and 510 against the sheet 500 squeezing the sheet 500 therebetween to form the thermoplastic sheet into the shape of article 10, FIG. 1. The control 544, when it displaces the electrodes, simultaneously turns off the RF energy from source 540 so that the displacement occurs after the sheet 500 is heated and softened. Control 544 causes the signal from source 540 to turn on and off and to cause the position means 542 to be activated in the desired time interval.

Figure 6:
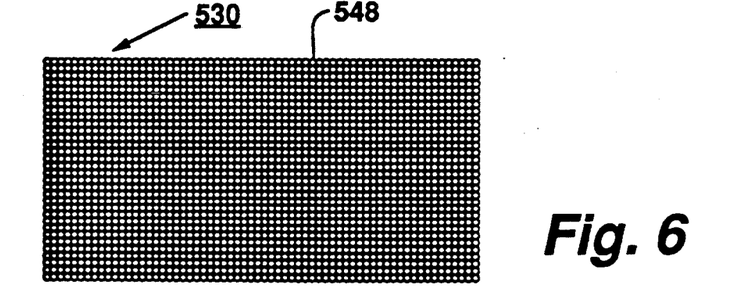
FIG. 6 is plan view of one of the electrodes employed in the embodiment of FIG. 5 taken along the lines 6—6.
Figure 7:
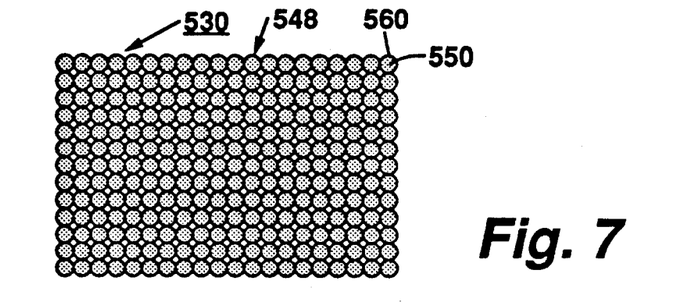
FIG. 7 is a more detailed plan view of a portion of the electrode of FIG. 6 illustrating its construction.

In FIG. 6, typical electrode 530 comprises an array of friction locked rod assemblies 548. The assemblies 548 are shown in more detail in FIG. 7. The assemblies 548 each comprise a metal circular cylindrical element 550 enclosed within a slightly deformable outer metal tube 560 in friction engagement therewith. The rods are locked into position in the tube by a transverse clamp (not shown). Such structures are known. The rods each may be selectively released for sliding in the corresponding tubes 560 independently of one another by applying axial pressure on each of the rods in a given direction. Once the rods are shifted in position to a given surface shape, they may be clamped in position and held there rigidly. Each of the rods 550 are electrically conductive and electrically conductively connected to tubes 560 which are electrically conductively coupled to one another to form a single electrical conductor. Once the rods are locked in place to a given shape, for example, to the shape of electrodes 530 and 508 of FIG. 5, they create voltage gradients across free space and the molds in directions parallel to directions 550 which when combined produces the more desirable uniform potentials at sheet 500.

In the alternative, a structure corresponding to electrodes 508 and 530 may be formed from a single rigid integral metal member having a surface corresponding to the surfaces of electrodes 530 and 508. The surface of the electrode is contoured to create the desired voltage gradients in directions 550. Such a rigid electrode structure would be specially fabricated for a given implementation as compared to a universal electrode 530 shown in FIG. 6 which may be reshaped for differently configured mold members.

In the alternative to employing the electrodes of the embodiment of FIG. 5 to apply pressure against the mold members, the electrodes may be attached to a movable mechanism (not shown) which displaces the electrodes out of the mold for permitting the mold members to be squeezed by a mold apparatus. That is, the primary purpose of the electrodes is to heat the thermoplastic sheet while in the mold and the primary purpose of the mold members is to deform the heated sheet.

Figure 8:
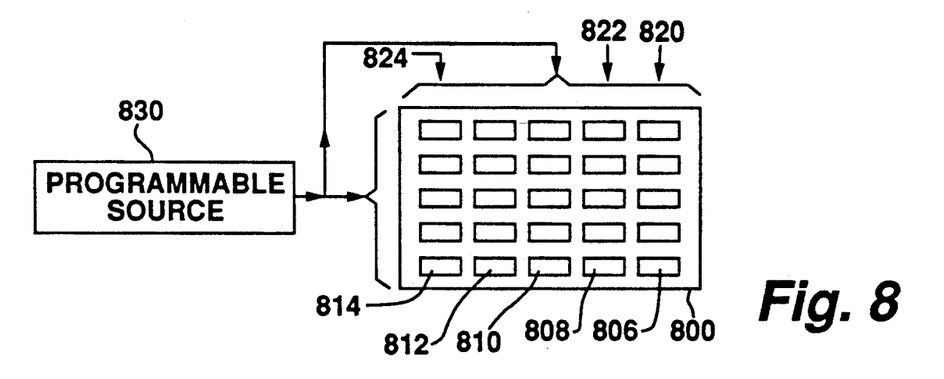
FIG. 8 is a plan view of an apparatus partially in diagrammatic and schematic form according to a third embodiment of the present invention.
Figure 9:
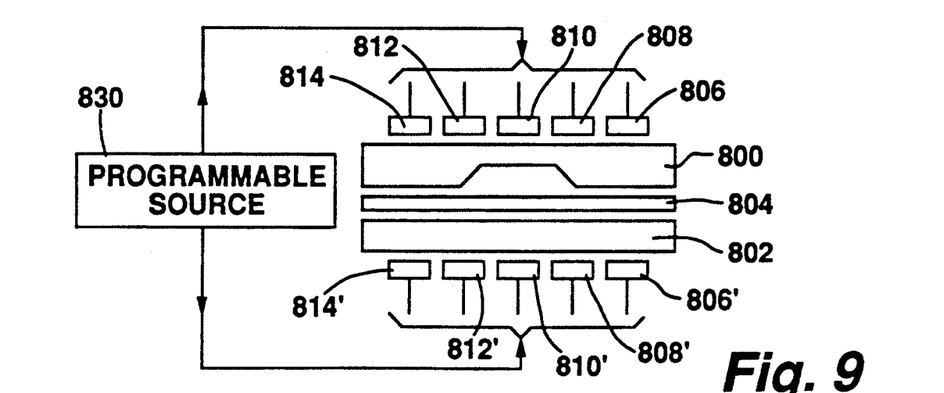
FIG. 9 is a side elevation view of the apparatus of the embodiment FIG. 8.

In FIGS. 8 and 9, an alternative structure is illustrated comprising a pair of dielectric mold members 800 and 802 for deforming a thermoplastic sheet 804. The mold member 800 has a non-uniform thickness for deforming the sheet 804 to a given configuration. Disposed adjacent to mold member 800 is a plurality of rows of electrode arrays, e.g., array of RF electrodes 806-814. Disposed adjacent to mold member 802 are mating rows of electrodes, e.g., array of RF electrodes 806'-814'. Electrodes 806 and 806' are aligned to form a mating pair as are electrodes 808 and 808', and so forth.

In FIG. 8, the electrode 806–814 and their mating aligned pair electrodes 806′–814′ (not shown in FIG. 8) form a row of electrodes. The electrode pairs are in columns 820–824. 824. The columns and rows of electrode pairs form a matrix of electrode pairs disposed in the area above and below the mold members 800 and 802.

A programmable source 830 of RF signals apply an RF signal of a selected value to each electrode pair, for example, the pair of electrodes 806 and 806′ and so forth. The RF signal value is selected in accordance with the desired RF field required at the thermoplastic sheet 804 in that area. The selected fields heat the sheet in accordance with the desired heat distribution. The electrodes may apply non-uniform RF fields to the sheet 804 should the sheet require different heat distributions due to different requirements of different implementations, such as different thicknesses of the sheet 804 that need to be heated and softened. For example, certain of the electrodes may be energized at higher levels than others to provide increased heating of the sheet 804 at certain regions as desired. Any one or more of the electrode pairs may be energized with the same or different RF signal values to produce the field of the desired potential in the region of the thermoplastic material to be molded. The important aspect is that the electrode matrix array provides settable, controllable RF fields at the material to be heated by passing RF energy through a mold. The matrix array selectively heats the material in an arrangement established in accordance with a given implementation. The electrode pairs may be part of the mold arrangement or may be removed from the mold once the sheet material is heated as explained above in connection with the embodiment of FIG. 5.

What is claimed is:

1. Apparatus for heating plastic material in a mold comprising:
   a plurality of spaced apart pairs of electrodes disposed in a mold; and
   means for applying a radio frequency signal to each of said pairs of electrodes, each signal applied having a preselectable voltage, with said means for applying a radio frequency signal capable of applying different voltages to different pairs of electrodes.

2. The apparatus of claim 1 wherein one member from each of said plurality of pairs of electrodes is situated in a first planar array and the other member from each of said plurality of pairs of electrodes is situated in a second planar array.

3. An apparatus for deforming thermoplastic material comprising:
   heating means for heating the thermoplastic material to be formed, said heating means including first and second electrode assemblies and a radio frequency generator for producing an electric field between said first and second electrode assemblies;
   means for producing varying field strengths between selected portions of said electric field; and
   a mold situated between said first and second electrode assemblies, said mold having first and second opposing dielectric mold members for receiving the thermoplastic material to be deformed.

4. The apparatus of claim 3 wherein both of said first and second electrode assemblies include a plurality of electrode segments and said means for producing varying field strengths comprises means for selectively moving said electrode segments of each of said electrodes assemblies relative to one another.

5. The apparatus of claim 4 wherein said electrode segments of said first electrode assembly are contiguous to one another and said electrode segments of said second electrode assembly are contiguous to one another.

6. The apparatus of claim 3 wherein both of said first and second electrode assemblies include a plurality of electrode segments, and said means for producing varying field strengths comprises means for controlling said radio frequency generator to selectively apply variable radio frequency signals to selected pairs of said electrode segments of said first and second electrode assemblies.

7. The apparatus of claim 6 wherein said plurality of electrode segments of the first electrode assembly is arranged in a first planar array and said plurality of electrode segments of the second electrode assembly is arranged in a second planar array.

* * * * *

UNITED STATES PATENT AND TRADEMARK OFFICE
CERTIFICATE OF CORRECTION

PATENT NO. : 5,082,436
DATED : January 21, 1992
INVENTOR(S) : Charles Tak-Ming Choi et al.

It is certified that error appears in the above-identified patent and that said Letters Patent is hereby corrected as shown below:

On the Title page, item [76]:

In the listing of Inventors, the name "Tak-Ming Choi" should be --Charles Tak-Ming Choi--.

Signed and Sealed this

Twenty-seventh Day of April, 1993

Attest:

MICHAEL K. KIRK

*Attesting Officer*   Acting Commissioner of Patents and Trademarks